United States Patent
Ren et al.

(10) Patent No.: US 8,233,292 B2
(45) Date of Patent: *Jul. 31, 2012

(54) CONTROLLERS, SYSTEMS AND METHODS FOR CONTROLLING POWER OF LIGHT SOURCES

(75) Inventors: Zhimou Ren, Chengdu (CN); Yunning Xie, Chengdu (CN); Yu-Chang Hsu, Taipei (TW)

(73) Assignee: O2Micro, Inc., Santa clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,907

(22) Filed: Apr. 19, 2011

(65) Prior Publication Data
US 2011/0227506 A1    Sep. 22, 2011

Related U.S. Application Data

(63) Continuation-in-part of application No. 12/712,407, filed on Feb. 25, 2010.

(30) Foreign Application Priority Data

Apr. 1, 2011    (CN) .......................... 2011 1 0085847

(51) Int. Cl.
H02M 3/335    (2006.01)
(52) U.S. Cl. .................... 363/21.12; 363/21.04
(58) Field of Classification Search .............. 363/16–20, 363/21.05, 21.07, 21.12, 72, 89, 56.02, 97, 363/131, 21.04, 21.18, 41, 56.01, 98, 127, 363/132; 323/222, 282–288, 272, 351, 235, 323/267; 315/246, 247, 291, 307, 312, 276, 315/224
See application file for complete search history.

(56) References Cited

U.S. PATENT DOCUMENTS

| | | | | |
|---|---|---|---|---|
| 4,724,363 | A * | 2/1988 | Buer | 315/307 |
| 5,909,363 | A * | 6/1999 | Yoon | 363/21.16 |
| 5,991,170 | A * | 11/1999 | Nagai et al. | 363/20 |
| 6,208,533 | B1 * | 3/2001 | Ogawa | 363/21.08 |
| 6,396,718 | B1 * | 5/2002 | Ng et al. | 363/21.07 |
| 6,515,876 | B2 * | 2/2003 | Koike et al. | 363/21.16 |
| 7,310,244 | B2 * | 12/2007 | Yang et al. | 363/97 |
| 7,394,209 | B2 | 7/2008 | Lin et al. | |
| 7,433,210 | B2 * | 10/2008 | Meitzner et al. | 363/21.12 |
| 7,697,308 | B2 * | 4/2010 | Huynh et al. | 363/21.16 |
| 8,045,344 | B2 | 10/2011 | Grant | |
| 2010/0172158 | A1 | 7/2010 | Sato et al. | |

FOREIGN PATENT DOCUMENTS

JP    2008312335 A    12/2008
WO    2008054083 A1    5/2008

* cited by examiner

*Primary Examiner* — Rajnikant Patel

(57) ABSTRACT

A controller for controlling power to an LED light source includes a control terminal and control circuitry coupled to the control terminal. The control terminal provides a control signal to control a transformer. A cycle of the control signal includes a charging period, a discharging period, and an adjusting period. The control circuitry controls a primary winding of the transformer to receive power during the charging period and controls a secondary winding of the transformer to discharge power to the LED light source during the discharging period. The control circuitry further varies a frequency of the control signal periodically by controlling the adjusting period.

20 Claims, 10 Drawing Sheets

US 8,233,292 B2

CONTROLLERS, SYSTEMS AND METHODS FOR CONTROLLING POWER OF LIGHT SOURCES

RELATED APPLICATION

This application is a continuation-in-part of U.S. patent application Ser. No. 12/712,407, filed on Feb. 25, 2010, entitled "Circuits and Methods for Controlling Power Converters Including Transformers", which is hereby incorporated by reference in its entirety. This application claims foreign priority to Chinese Patent Application No. 201110085847.0, entitled "Controller, System and Method for Controlling Energy of Light Source", filed on Apr. 1, 2011 with the State Intellectual Property Office in China. The U.S. patent application Ser. No. 12/712,407, filed on Feb. 25, 2010, claims priority to Chinese Patent Application No. 200910265547.3, entitled "Circuits and Methods for Controlling Power Converters Including Transformers," filed on Dec. 25, 2009 with the State Intellectual Property Office in China.

BACKGROUND

A flyback converter is a switch mode power supply circuit that can be used in applications such as AC-to-DC adapters and battery chargers. FIG. 1 shows a block diagram of a conventional flyback converter 100. The flyback converter 100 utilizes a controller 120 to control a transformer. The transformer includes a primary winding 104 coupled to a DC source $V_{BB}$, a secondary winding 106 coupled to a load 112, and an auxiliary winding 108. The controller 120 controls a switch 118 coupled in series with the primary winding 104. When the switch 118 is turned on, a current flows through the primary winding 104 and energy is stored in a magnetic core 124 of the transformer. When the switch 118 is turned off, a diode 110 coupled to the secondary winding 106 is forward biased, and thus the energy stored in the magnetic core 124 is released through the secondary winding 106 to a capacitor 122 and the load 112. An error amplifier 114 compares the current flowing through a current sense resistor 111 with a reference current to generate a feedback signal FB. The feedback signal FB is transferred to the controller 120 through an optical coupler 116. The controller 120 controls the switch 118 based on the feedback signal FB to adjust the output power of the transformer. However, this conventional flyback converter 100 has relatively large size. In addition, electromagnetic interference (EMI) exists during the operation of the flyback converter 100 due to electromagnetic induction of the transformer.

SUMMARY

A controller for controlling power to an LED light source includes a control terminal and control circuitry coupled to the control terminal. The control terminal provides a control signal to control a transformer. A cycle of the control signal includes a charging period, a discharging period, and an adjusting period. The control circuitry controls a primary winding of the transformer to receive power during the charging period and controls a secondary winding of the transformer to discharge power to the LED light source during the discharging period. The control circuitry further varies a frequency of the control signal periodically by controlling the adjusting period.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
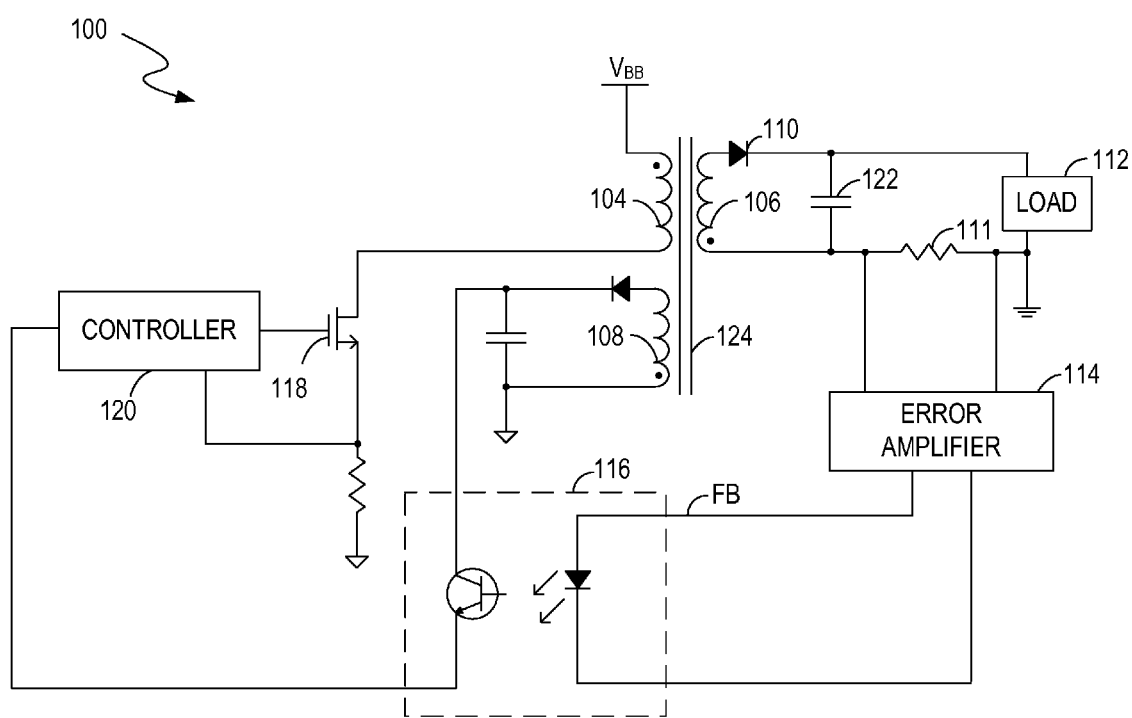
FIG. 1 shows a block diagram of a conventional flyback converter.

Embodiments in accordance with the present invention provide circuits and methods for controlling power converters that can be used to power various types of loads. The power converter can include a transformer and a controller for controlling the transformer. The controller can control a switch coupled in series with a primary winding of the transformer. Advantageously, the on/off time of the switch can be controlled in a way such that the transformer can provide a substantially constant current at its secondary winding. The output power of the power converter can be controlled without requiring some circuit components such as an optical coupler and an error amplifier shown in the conventional power converter in FIG. 1. Thus, the size and efficiency of the power converter can be improved.

Figure 2:
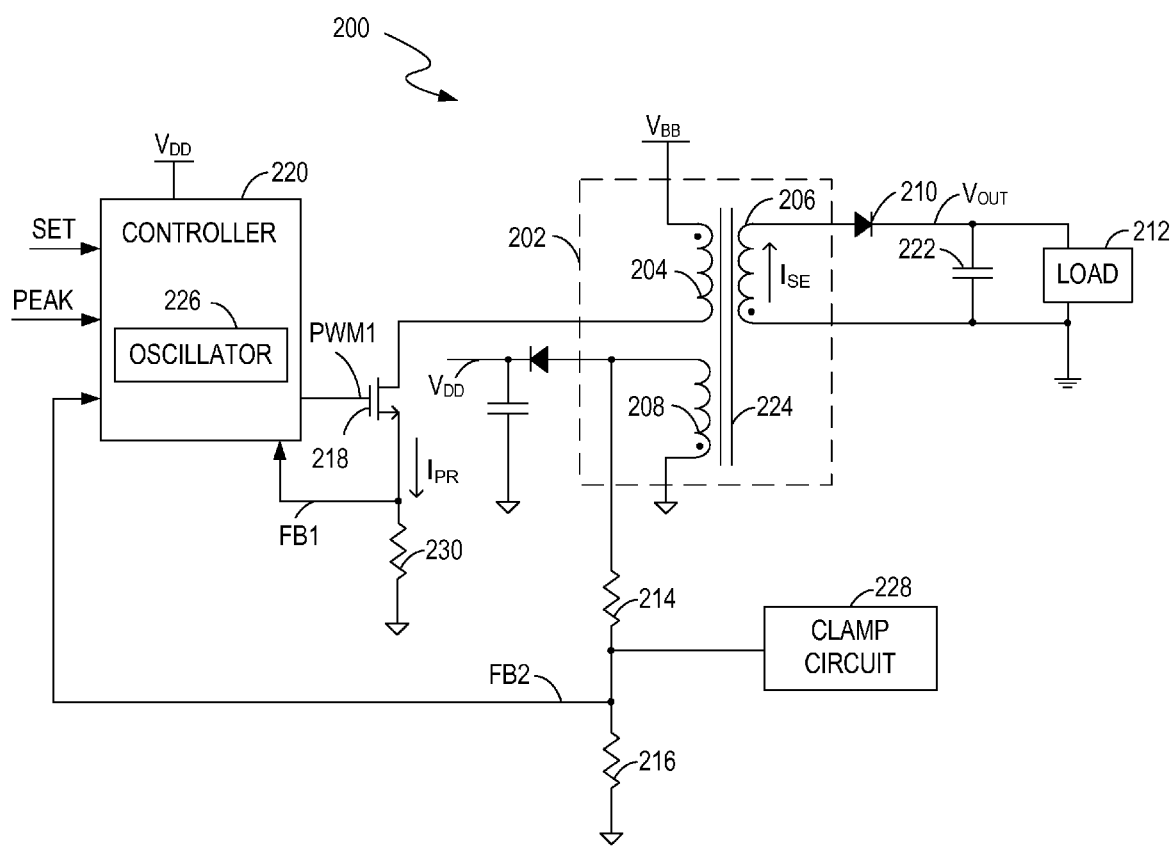
FIG. 2 shows a block diagram of a power converter, in accordance with one embodiment of the present invention.
Figure 4:
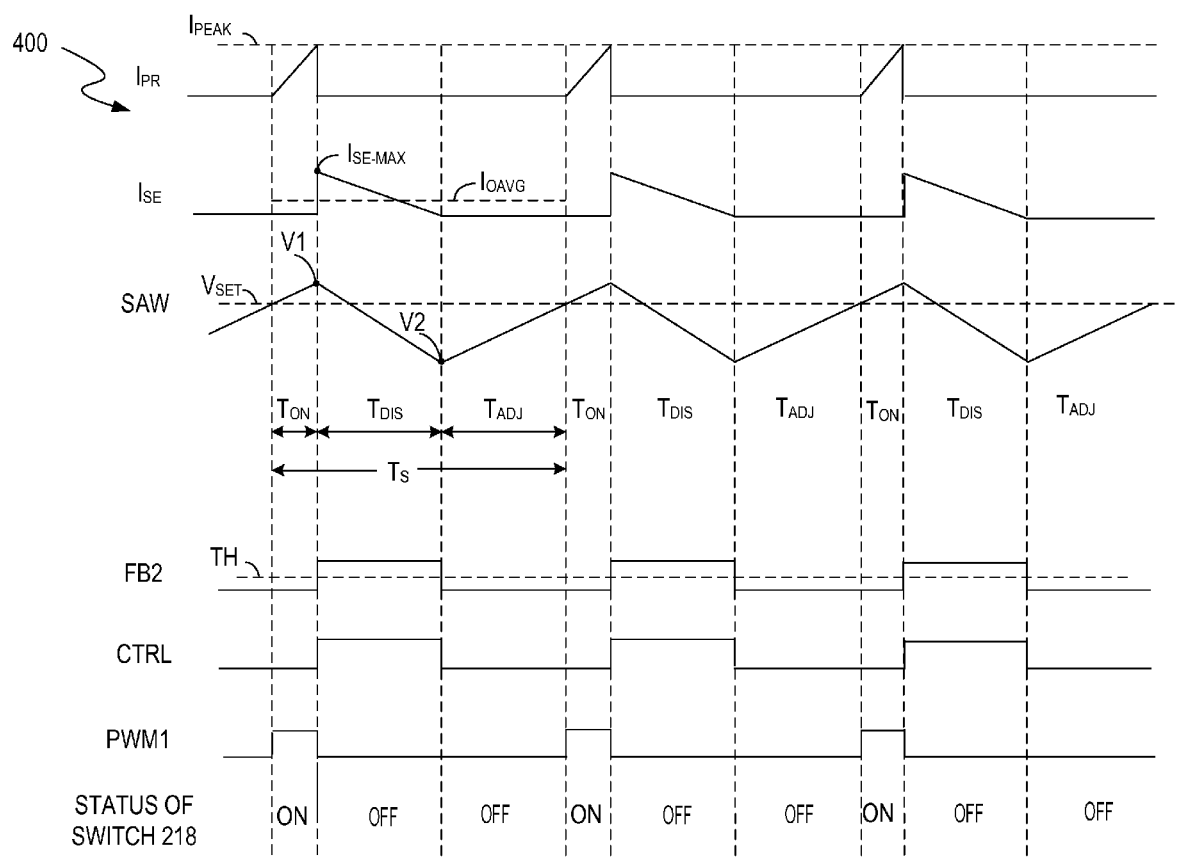
FIG. 4 shows signal waveforms of signals received or generated by a power converter, in accordance with one embodiment of the present invention.

FIG. 2 shows a block diagram of a power converter 200, in accordance with one embodiment of the present invention. FIG. 4 shows signal waveforms of signals received or generated by the power converter 200, in accordance with one embodiment of the present invention. FIG. 2 is described in combination with FIG. 4.

In the example of FIG. 2, the power converter 200 includes a controller 220 to control an operation of a transformer 202.

In one embodiment, the transformer 202 includes a primary winding 204, a secondary winding 206, and an auxiliary winding 208. The primary winding 204 has one end coupled to a DC input voltage $V_{BB}$, and the other end coupled to ground through a switch 218 and a resistor 230. The secondary winding 206 is coupled to a load 212 through a diode 210. In one embodiment, the auxiliary winding 208 is at the primary side of the transformer 202. The auxiliary winding 208 has one end coupled to ground through a resistor 214 and a resistor 216, and the other end coupled to ground.

The controller 220 can control the transformer 202 by controlling the switch 218 coupled in series with the primary winding 204. In one embodiment, the controller 220 can be powered by a voltage $V_{DD}$ which is provided by the auxiliary winding 208. The resistor 230 can provide a feedback signal FB1 indicative of a current $I_{PR}$ flowing through the primary winding 204. The auxiliary winding 208 can provide a feedback signal FB2 indicative of an output voltage of the auxiliary winding 208, which can further indicate an output voltage of the secondary winding 206. As such, the feedback signal FB2 can indicate whether a current $I_{SE}$ flowing through the secondary winding 206 decreases to a predetermined current level, e.g., zero. In one embodiment, the feedback signal FB2 can be generated at a node between the resistor 214 and the resistor 216.

The power converter 200 can further include a signal generator 226 (e.g., an oscillator 226) and a clamp circuit 228. The clamp circuit 228 is operable for clamping a voltage of the feedback signal FB2 when the switch 218 is turned on. In one embodiment, the controller 220 receives a reference signal PEAK which can determine a peak current level $I_{PEAK}$ of the current $I_{PR}$ flowing through the primary winding 204, and receives a reference signal SET having a reference voltage level $V_{SET}$. In another embodiment, the reference signal PEAK and the reference signal SET are generated locally by the controller 220.

In operation, the controller 220 can receive the feedback signal FB1 and the feedback signal FB2, and generate a pulse signal, e.g., a pulse-width modulation signal PWM1, based on the feedback signal FB1 and the feedback signal FB2 to control the switch 218. By controlling the switch 218 coupled in series with the primary winding 204, the transformer 202 can operate in multiple switching cycles. In one embodiment, a switching cycle includes a charging period $T_{ON}$, a discharging period $T_{DIS}$, and an adjusting period $T_{ADJ}$, as shown in the example of FIG. 4. During the charging period $T_{ON}$, the transformer 202 is powered by the input voltage $V_{BB}$ and the current $I_{PR}$ flowing through the primary winding 204 increases. During the discharging period $T_{DIS}$, the transformer 202 discharges to power the load 212 and the current $I_{SE}$ flowing through the secondary winding 206 decreases.

More specifically, during the charging period $T_{ON}$, the controller 220 can turn on the switch 218 so that the transformer 202 is powered by the input voltage $V_{BB}$. When the switch 218 is on, the diode 210 coupled to the secondary winding 206 is reverse-biased such that there is no current flowing through the secondary winding 206. The current $I_{PR}$ flows through the primary winding 204, the switch 218, and the resistor 230 to ground. The current $I_{PR}$ can be increased linearly. Thus, during the charging period $T_{ON}$, energy can be stored in a magnetic core 224 of the transformer 202. The clamp circuit 228 is operable for clamping a voltage of the feedback signal FB2 during the charging period $T_{ON}$, and thus the voltage of the feedback signal FB2 is substantially zero.

During the discharging period $T_{DIS}$, the controller 220 turns off the switch 218 and the transformer 202 is discharged to power the load 212. When the switch 218 is off, the diode 210 coupled to the secondary winding 206 is forward-biased, and thus the energy stored in the magnetic core 224 is released through the secondary winding 206 to a capacitor 222 and the load 212. The current $I_{SE}$ flowing through the secondary winding 206 can be decreased linearly from a peak current level $I_{SE-MAX}$ to a predetermined current level, e.g., zero, during the discharging period $T_{DIS}$. The peak current level $I_{SE-MAX}$ of the secondary winding 206 is determined by the peak current level $I_{PEAK}$ of the primary winding 204 and a coil ratio of the transformer 202.

During the adjusting period $T_{ADJ}$, the switch 218 remains off. In one embodiment, there is no current flowing through the primary winding 204 or the secondary winding 206 during the adjusting period $T_{ADJ}$.

According to the waveform of the current $I_{SE}$ of the secondary winding 206 as shown in FIG. 4, the average level $I_{OAVG}$ of the output current provided by the secondary winding 206 during a switching cycle $T_S$ can be calculated by:

$$I_{OAVG} = \frac{I_{SE-MAX}}{2} \cdot \left(\frac{T_{DIS}}{T_S}\right), \quad (1)$$

where $T_S = T_{ON} + T_{DIS} + T_{ADJ}$.

The duration of the charging period $T_{ON}$ and the duration of the discharging period $T_{DIS}$ can be determined by the inductance of the primary winding 204, the inductance of the secondary winding 206, the input voltage $V_{BB}$, and an output voltage $V_{OUT}$ across the load 212, in one embodiment. The controller 220 can determine a proper duration of the adjusting period $T_{ADJ}$ such that a ratio of the duration of the discharging period $T_{DIS}$ to the duration of the switching cycle $T_S$ is constant, wherein the duration of the switching cycle $T_S$ is the total duration of the charging period $T_{ON}$, the discharging period $T_{DIS}$ and the adjusting period $T_{ADJ}$. In equation (1), the peak current level $I_{SE-MAX}$ of the secondary winding 206 is determined by the peak current level $I_{PEAK}$ of the primary winding 204 and the coil ratio of the transformer 202. In one embodiment, since the peak current level $I_{PEAK}$ of the primary winding 204 can be a predetermined value and the coil ratio of the transformer 202 is constant, the peak current level $I_{SE-MAX}$ of the secondary winding 206 can be constant. Consequently, according to equation (1), if a ratio of the duration of the discharging period $T_{DIS}$ to the duration of the switching cycle $T_S$ is constant (e.g., $T_S = k^* T_{DIS}$, k is constant), the average level $I_{OAVG}$ of the output current provided by the secondary winding 206 can be substantially constant.

Advantageously, even though the input voltage $V_{BB}$ and the output voltage $V_{OUT}$ may vary, the average level $I_{OAVG}$ of the output current can still be maintained substantially constant if a ratio of the duration of the discharging period $T_{DIS}$ to the duration of the switching cycle $T_S$ is constant. In other words, by using a filter, e.g., a capacitor 222 coupled to the load 212, the power converter 200 can provide a substantially constant output current to the load 212. As used herein, "substantially constant" means that the output current may vary but within a range such that the current ripple caused by non-ideality of the circuit components can be neglected.

Figure 3:
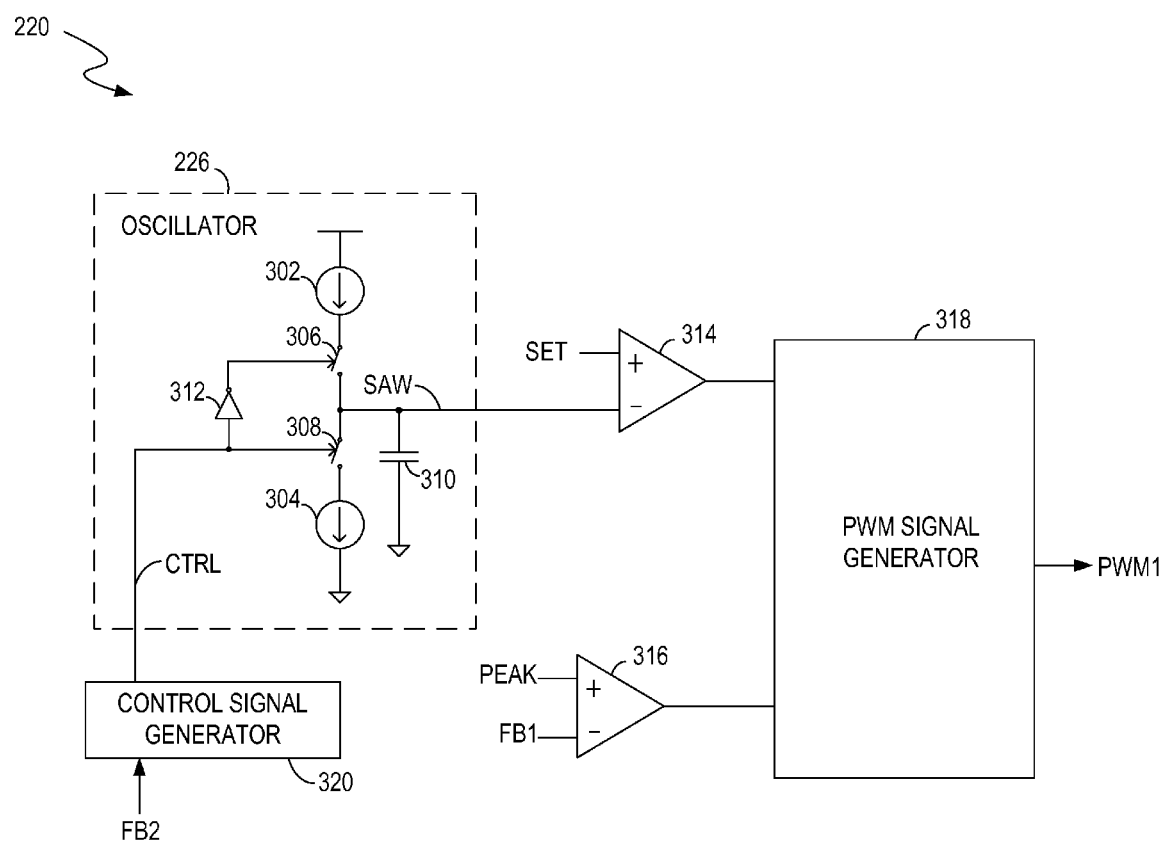
FIG. 3 shows an example of the controller in FIG. 2, in accordance with one embodiment of the present invention.

FIG. 3 shows an example of the controller 220 in FIG. 2, in accordance with one embodiment of the present invention. FIG. 3 is described in combination with FIG. 2 and FIG. 4. The controller 220 can determine a proper duration of the adjusting period $T_{ADJ}$ such that a ratio of the duration of the discharging period $T_{DIS}$ to the duration of the switching cycle $T_S$ is constant. Consequently, the power converter 200 can provide a substantially constant output current to the load 212.

In one embodiment, the controller 220 can include a signal generator 226 (e.g., an oscillator 226), a comparator 314, a comparator 316, and a pulse signal generator 318 (e.g., a PWM signal generator 318). The oscillator 226 is operable for generating a signal, e.g., a sawtooth wave signal SAW, based on a feedback signal FB2. The feedback signal FB2 indicates an output voltage of the secondary winding 206. The comparator 314 is operable for comparing the sawtooth wave signal SAW with a reference signal SET. The reference signal SET has a reference voltage level $V_{SET}$. The comparator 316 is operable for comparing the feedback signal FB1 with a reference signal PEAK. The feedback signal FB1 can indicate the current $I_{PR}$ flowing through the primary winding 204. The reference signal PEAK can determine the peak current level $I_{PEAK}$ of the current $I_{PR}$ flowing through the primary winding 204. The PWM signal generator 318 coupled to the comparator 314 and the comparator 316 is operable for generating a pulse signal, e.g., a pulse-width modulation signal PWM1. The sawtooth wave signal SAW from the oscillator 226 can be configured to control a duty cycle of the pulse-width modulation signal PWM1. The pulse-width modulation signal PWM1 is applied to the switch 218 to control a conductance status of the switch 218 and thus to control power of the transformer 202.

The controller 220 can further include a control signal generator 320 to generate a control signal CTRL based on the feedback signal FB2. The control signal CTRL is applied to the oscillator 226. In one embodiment, if the voltage of the feedback signal FB2 is greater than a predetermined threshold TH (e.g., TH>0V), the control signal CTRL is logic 1; otherwise the control signal CTRL is logic 0. In the example of FIG. 3, the oscillator 226 includes current sources 302 and 304, switches 306 and 308, and a capacitor 310. The capacitor 310 generates an output voltage which is the sawtooth wave signal SAW. The capacitor 310 can be charged by a current from the current source 302 or be discharged by a current from the current source 304 depending on the conduction status of the switch 306 and the switch 308.

In operation, if the voltage of the capacitor 310 increases to the reference voltage level $V_{SET}$, the controller 220 can generate a pulse-width modulation signal PWM1 having a first level to turn on the switch 218 (e.g., the pulse-width modulation signal PWM1 is logic 1). Thus, the transformer 202 can operate in the charging period $T_{ON}$. The clamp circuit 228 can force the voltage of the feedback signal FB2 to be substantially zero such that the control signal CTRL has a first level, e.g., logic 0, in one embodiment. The control signal CTRL controls the switch 308 in the oscillator 226. Moreover, the control signal CTRL is coupled to the switch 306 through a NOT gate 312. In the example of FIG. 3, when the control signal CTRL is logic 0, the switch 306 is turned on and the switch 308 is turned off. The capacitor 310 is charged by a current from the current source 302. Thus, the voltage of capacitor 310, e.g., the sawtooth wave signal SAW, can increase from the reference voltage level $V_{SET}$. Meanwhile, the current $I_{PR}$ flowing through the primary winding 204 increases. The comparator 316 compares the feedback signal FB1 with the reference signal PEAK. When the voltage of the feedback signal FB1 reaches the voltage of the reference signal PEAK, which indicates that the current $I_{PR}$ through the primary winding 204 increases to the peak current level $I_{PEAK}$, the controller 220 can turn off the switch 218 to terminate the charging period $T_{ON}$ and to initiate a discharging period $T_{DIS}$. More specifically, the PWM signal generator 318 can generate the pulse-width modulation signal PWM1 having a second level (e.g., the pulse-width modulation signal PWM1 is logic 0) to turn off the switch 218. At the end of the charging period $T_{ON}$, the voltage of the capacitor 310, e.g., the sawtooth wave signal SAW, can increase to a first level $V_1$ as shown in FIG. 4. In other words, the switch 218 is turned on when the sawtooth wave signal SAW (the voltage across the capacitor 310) increases from the reference voltage level $V_{SET}$ until the sawtooth wave signal SAW reaches the first level $V_1$.

During the discharging period $T_{DIS}$, the switch 218 is turned off and the current $I_{SE}$ flowing through the secondary winding 206 decreases from a peak level $I_{SE-MAX}$. The auxiliary winding 208 can generate a substantially constant output voltage during the discharging period $T_{DIS}$, in one embodiment. This output voltage is divided by the resistor 214 and the resistor 216. Therefore, during the discharging period $T_{DIS}$, the voltage of the feedback signal FB2 (e.g., the voltage across the resistor 216) is proportional to the output voltage of the auxiliary winding 208, and thus can also be substantially constant. In one embodiment, the resistance of the resistor 214 and the resistance of the resistor 216 are chosen in a way such that the voltage of the feedback signal FB2 is greater than the predetermined threshold TH during the discharging period $T_{DIS}$. In the example of FIG. 3, because the feedback signal FB2 has a voltage greater than the threshold TH, the control signal CTRL is logic 1. As a result, the switch 306 is turned off and the switch 308 is turned on. The capacitor 310 is discharged by a current from the current source 304. Accordingly, the voltage of capacitor 310 can decrease from the first level $V_1$.

When the voltage of the feedback signal FB2, which indicates the output voltage of the secondary winding 206, decreases to the threshold TH, e.g., the current $I_{SE}$ flowing through the secondary winding 206 decreases to a predetermined current level, the controller 220 can terminate the discharging period $T_{DIS}$ and initiate an adjusting period $T_{ADJ}$. In one embodiment, the controller 220 terminates the discharging period $T_{DIS}$ and initiates an adjusting period $T_{ADJ}$ when the current $I_{SE}$ flowing through the secondary winding 206 decreases to substantially zero. At the end of the discharging period $T_{DIS}$, the voltage of the capacitor 310, e.g., the sawtooth wave signal SAW, can decrease to a second level $V_2$ as shown in FIG. 4.

During the adjusting period $T_{ADJ}$, because the voltage of the feedback signal FB2 decreases to the threshold TH, the control signal CTRL turns to logic 0. The switch 306 is turned on and switch 308 is turned off. The capacitor 310 is charged again by the current from the current source 302. The voltage of the capacitor 310 increases from the second level $V_2$. During the adjusting period $T_{ADJ}$, the switch 218 remains off and there is no current flowing through the primary winding 204 or the secondary winding 206. When the sawtooth wave signal SAW increases to the reference voltage level $V_{SET}$, the controller 220 terminates the adjusting period $T_{ADJ}$ and turns on the switch 218 to initiate a charging period $T_{ON}$ of a next switching cycle. More specifically, the PWM signal generator 318 can generate the pulse-width modulation signal PWM1 having the first level (e.g., the pulse-width modulation signal PWM1 is logic 1) to turn on the switch 218.

Assume that the capacitance of the capacitor 310 is $C_1$, the current of the current source 302 is $I_1$ and the current of the current source 304 is $I_2$. At the end of the charging period $T_{ON}$, the voltage of the sawtooth wave signal SAW (the voltage of the capacitor 310) can be given by:

$$V_1 = V_{SET} + \frac{T_{ON} \cdot I_1}{C_1}. \quad (2)$$

At the end of the discharging period $T_{DIS}$, the voltage of the sawtooth wave signal SAW can be given by:

$$V_2 = V_1 - \frac{T_{DIS} \cdot I_2}{C_1}. \quad (3)$$

At the end of the adjusting period $T_{ADJ}$, the voltage of the sawtooth wave signal SAW can be given by:

$$V_{SET} = V_2 + \frac{T_{ADJ} \cdot I_1}{C_1}. \quad (4)$$

Thus, the duration of the adjusting period $T_{ADJ}$ can be derived from equations (2)-(4), that is:

$$T_{ADJ} = \frac{(V_{SET} - V_2) \cdot C_1}{I_1} = T_{DIS} \cdot \frac{I_2}{I_1} - T_{ON}. \quad (5)$$

According to equation (5), the relationship between the duration of the discharging period $T_{DIS}$ and the duration of the switching cycle $T_S$ can be expressed by:

$$\frac{T_{DIS}}{T_S} = \frac{T_{DIS}}{T_{ON} + T_{DIS} + T_{ADJ}} = \frac{I_1}{I_1 + I_2}. \quad (6)$$

Thus, the ratio of the duration of the discharging period $T_{DIS}$ to a total duration of the charging period $T_{ON}$, the discharging period $T_{DIS}$ and the adjusting period $T_{ADJ}$ is determined by the current $I_1$ and the current $I_2$. Advantageously, the duration of the discharging period $T_{DIS}$ can be proportional to the duration of the switching cycle $T_S$ if the current $I_1$ from the current source 302 and the current $I_2$ from the current source 304 are constant. Therefore, referring back to equation (1), the average level $I_{OAVG}$ of the output current provided by the secondary winding 206 can be substantially constant.

Figure 5:
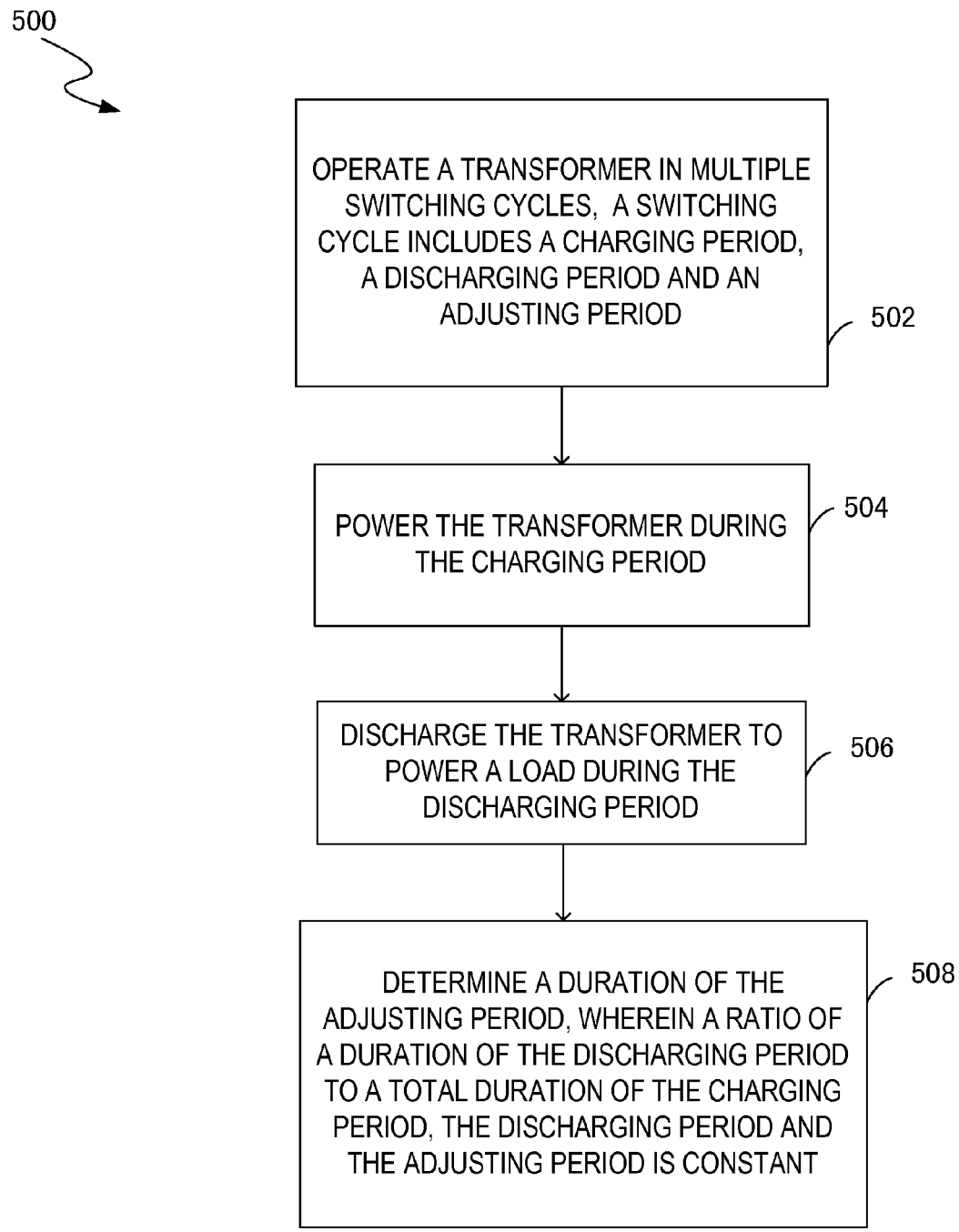
FIG. 5 shows a flowchart of a method for controlling a transformer, in accordance with one embodiment of the present invention.

FIG. 5 shows a flowchart 500 of a method for controlling a transformer, in accordance with one embodiment of the present invention. FIG. 5 is described in combination with FIG. 2, FIG. 3 and FIG. 4. In block 502, a transformer 202 is operated in multiple switching cycles. A switching cycle can include a charging period $T_{oN}$, a discharging period $T_{DIS}$, and an adjusting period $T_{ADJ}$.

In block 504, the transformer 202 is powered by an input power during the charging period $T_{ON}$. During the charging period $T_{ON}$, a switch 218 coupled in series with a primary winding 204 of the transformer 202 is switched on. In one embodiment, the charging period $T_{ON}$ can be controlled by monitoring a current flowing through the primary winding 204 of the transformer 202. More specifically, the charging period $T_{ON}$ can be terminated (the switch 218 is turned off at the end of the charging period $T_{ON}$) and a discharging period $T_{DIS}$ can be initiated when the current flowing through the primary winding 204 increases to a predetermined peak current level.

In block 506, the transformer 202 is discharged to power a load during the discharging period $T_{DIS}$. In one embodiment, the discharging period $T_{DIS}$ can be controlled by monitoring an output voltage of an auxiliary winding 208 of the transformer 202. The output voltage of the auxiliary winding 208 can indicate whether a current flowing through the secondary winding 206 of the transformer 202 decreases to a predetermined current level. More specifically, the discharging period $T_{DIS}$ can be terminated and an adjusting period $T_{ADJ}$ can be initiated when the current flowing through the secondary winding 206 decreases to the predetermined current level, e.g., zero. In one embodiment, the current flowing through the secondary winding 206 decreases to the predetermined current level if the output voltage of the auxiliary winding 208 decreases to a predetermined voltage.

In block 508, a duration of the adjusting period $T_{ADJ}$ is determined such that a ratio of a duration of the discharging period $T_{DIS}$ to a total duration of the charging period $T_{ON}$, the discharging period $T_{DIS}$ and the adjusting period $T_{ADJ}$ is constant. In one embodiment, the duration of the adjusting period $T_{ADJ}$ can be determined by an oscillator 226. The oscillator 226 is operable for generating a sawtooth wave signal SAW. During the charging period $T_{ON}$, the sawtooth wave signal SAW increases from a predetermined reference voltage level $V_{SET}$ to a first level $V_1$. During the discharging period $T_{DIS}$, the sawtooth wave signal SAW decreases from the first level $V_1$ to a second level $V_2$. During the adjusting period $T_{ADJ}$ the sawtooth wave signal SAW increases from the second level $V_2$ to the reference voltage level $V_{SET}$. The adjusting period $T_{ADJ}$ can be terminated when the sawtooth wave signal SAW increases to the reference voltage level $V_{SET}$ and a new switching cycle $T_S$ can begin.

Accordingly, embodiments in accordance with the present invention provide circuits and methods for controlling power converters that can be used to power various types of loads. The power converter includes a transformer operated in multiple switching cycles. At least one switching cycle includes a charging period $T_{ON}$, a discharging period $T_{DIS}$ and an adjusting period $T_{ADJ}$. The power converter can determine a proper duration of the adjusting period $T_{ADJ}$, such that a ratio of the duration of the discharging period $T_{DIS}$ to the duration of the switching cycle $T_S$ is constant. The duration of the switching cycle $T_S$ is the total duration of the charging period $T_{ON}$, the discharging period $T_{DIS}$ and the adjusting period $T_{ADJ}$. Therefore, an average output current of each switching cycle can be substantially constant.

The power converter according to the present invention can be used in various applications. In one embodiment, the power converter can provide a substantially constant current to power a light source such as a light emitting diode (LED) string. In another embodiment, the power converter can provide a substantially constant current to charge a battery.

Advantageously, compared with the conventional flyback converter which includes an optical coupler and an error amplifier, the size of the power converter according to the present invention is relatively small.

Moreover, even if the duration of the charging period $T_{ON}$ and the duration of the discharging period $T_{DIS}$ may vary with the change of the input voltage and the output voltage of the power converter, the power converter according to the present invention can automatically adjust the duration of the adjusting period $T_{ADJ}$ to maintain a ratio of the duration of the discharging period $T_{DIS}$ to the duration of the switching cycle $T_S$ to be constant. As a result, the power converter can be self-adjusted to provide a substantially constant average output current. In addition, as can be seen in equation (1), the average output current of the power converter is not affected by the inductance of the transformer windings. Therefore, the output current of the power converter can be controlled more accurately.

Moreover, in one embodiment, the present invention provides a controller for controlling power of an LED light source. More specifically, the controller can control a switch to control a power converter, such that the power converter provides a specified output current to power the LED light source. Advantageously, in one such embodiment, the controller can perform a jitter function, e.g., varying the switching frequency of the switch, such that the electromagnetic interference (EMI) of the power converter is reduced.

Figure 6:
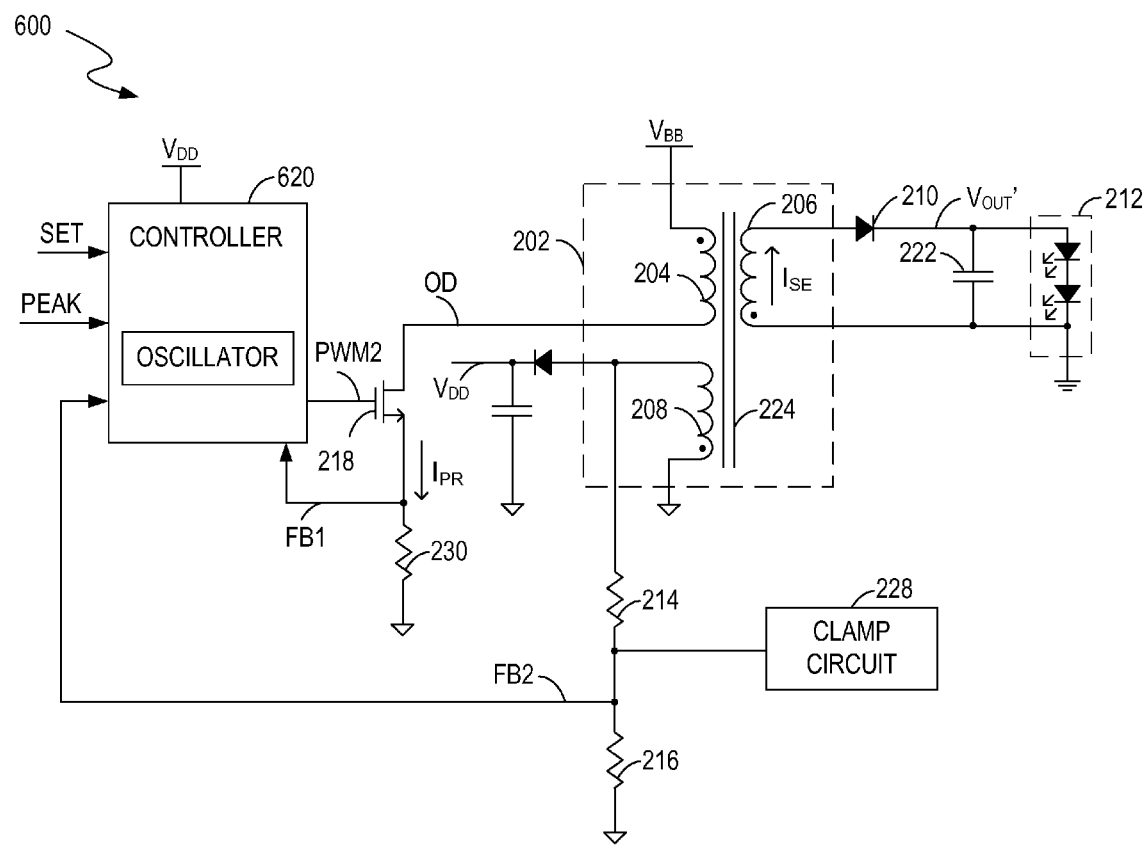
FIG. 6 shows a block diagram of an example of a power converter, in accordance with one embodiment of the present invention.
Figure 8A:
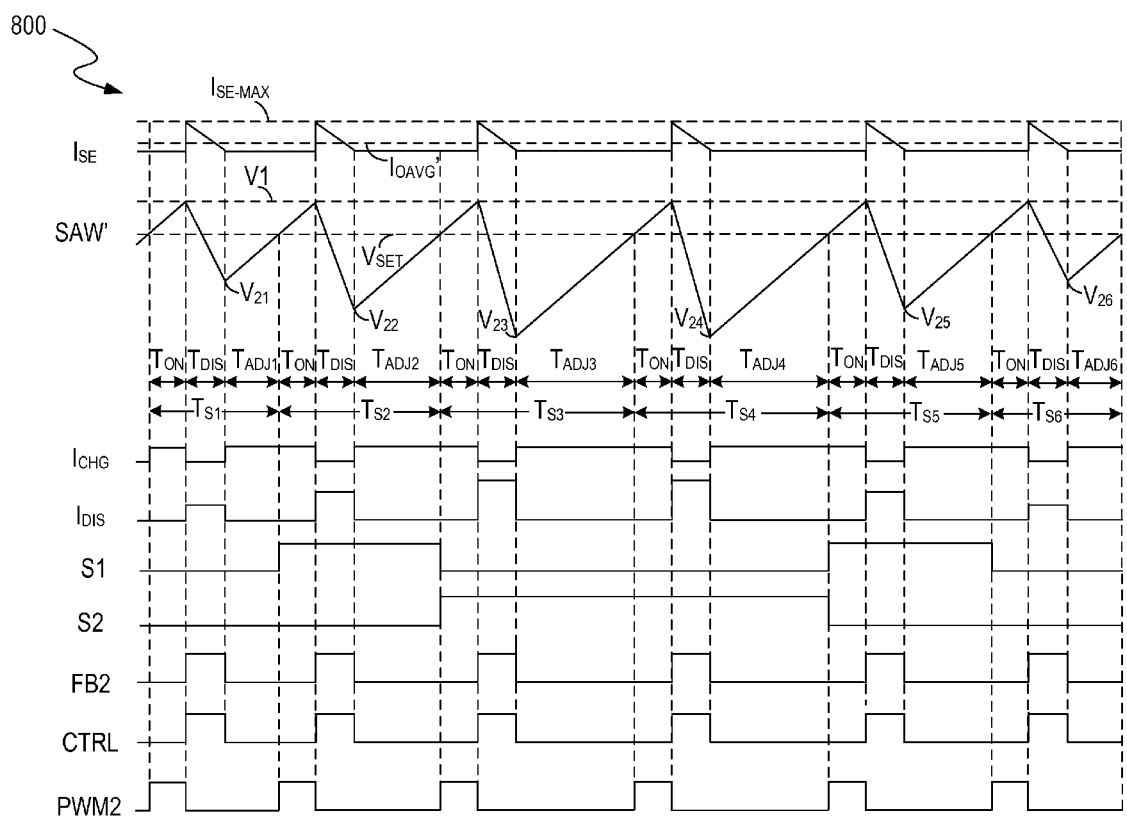
FIG. 8A and FIG. 8B show signal waveforms of examples of signals associated with the power converter in FIG. 6, in accordance with one embodiment of the present invention.
Figure 8B:
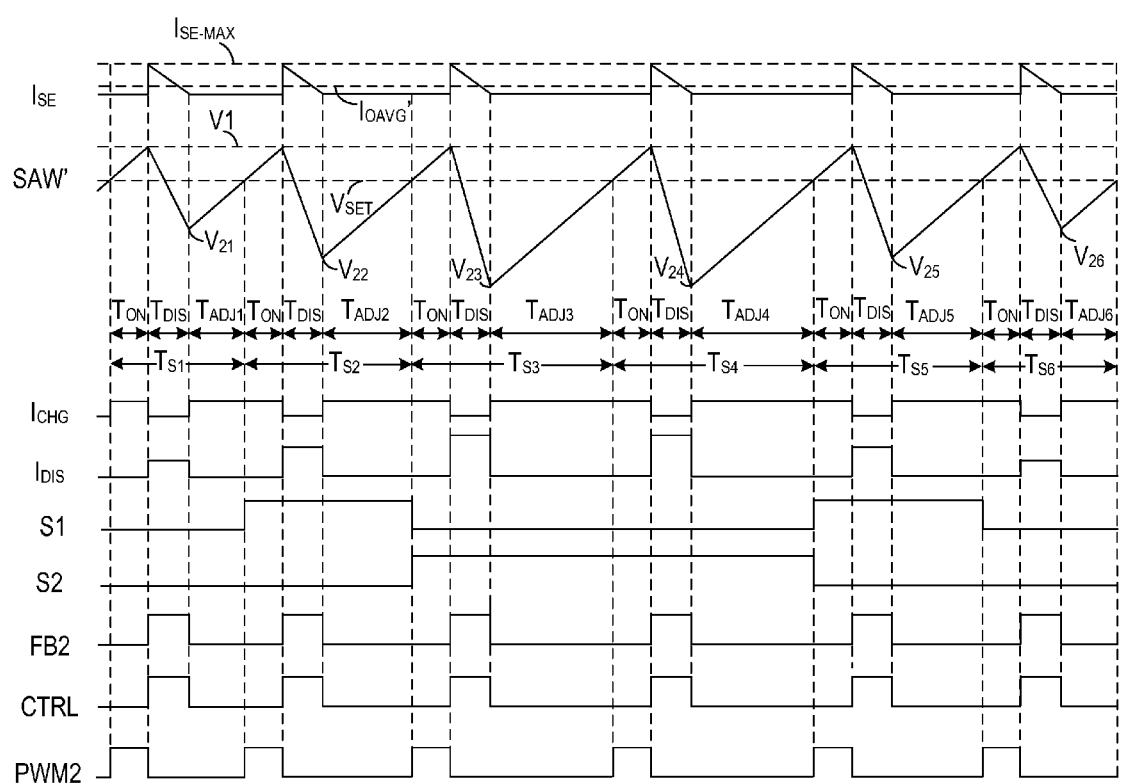

FIG. 6 shows a block diagram of an example of a power converter 600, in accordance with one embodiment of the present invention. Elements labeled the same as in FIG. 2 have similar functions. FIG. 8A and FIG. 8B show examples of signals associated with the power converter 600, in accordance with one embodiment of the present invention. FIG. 6 is described in combination with FIG. 2, FIG. 8A and FIG. 8B.

In the example of FIG. 6, the power converter 600 includes a controller 620, a transformer 202, and a clamp circuit 228. The controller 620 controls an operation of the transformer 202 based on the clamp circuit 228. In one embodiment, the transformer 202 includes a primary winding 204, a secondary winding 206, and an auxiliary winding 208.

In one embodiment, the controller 620 includes a control terminal coupled to the transformer 202 via the switch 218. The control terminal provides a control signal, e.g., a pulse modulation signal PWM2, to control the transformer 202 by controlling the switch 218. In another embodiment, the switch 218 together with the controller 620 is integrated in a chip. In one such embodiment, the chip includes a control terminal, e.g., the drain of the switch 218, to provide a control signal OD to control the transformer 202. The controller 620 further includes a first feedback terminal coupled to the resistor 230 to receive a feedback signal FB1 indicating whether the current $I_{PR}$ flowing through the primary winding 204 increases to a peak level $I_{PEAK}$. Moreover, the controller 620 includes a second feedback terminal coupled to the resistors 214 and 216 to receive a feedback signal FB2 indicating whether a current $I_{SE}$ flowing through the secondary winding 206 decreases to a bottom level, e.g., zero amperes.

The clamp circuit 228 is operable for clamping a voltage of the feedback signal FB2 when the switch 218 is turned on. In one embodiment, the controller 620 receives a reference signal PEAK which can determine the peak level $I_{PEAK}$ of the current $I_{PR}$ flowing through the primary winding 204, and receives a reference signal SET having a reference voltage level $V_{SET}$. In another embodiment, the reference signal PEAK and the reference signal SET are generated locally by the controller 620.

In operation, the controller 620 can generate a pulse signal, e.g., the pulse modulation signal PWM2, based on the feedback signals FB1 and FB2 to control the switch 218, such that the transformer 202 operates in multiple switching cycles. In one embodiment, a switching cycle $T_S$, includes a charging period $T_{ON}$, a discharging period $T_{DIS}$, and an adjusting period $T_{ADJi}$ (e.g., i=1, 2, 3, etc.), as shown in the example of FIG. 8A. During the charging period $T_{ON}$, the controller 620 maintains the switch 218 on, and controls the primary winding 204 of the transformer 202 to receive power from the input voltage $V_{BB}$, and therefore the current $I_{PR}$ flowing through the primary winding 204 increases. During the discharging period $T_{DIS}$, the controller 620 maintains the switch 218 off, and controls the secondary winding 206 of the transformer 202 to discharge power to a load 212, e.g., an LED light source including one or more LEDs or LED strings, and therefore the current $I_{SE}$ flowing through the secondary winding 206 decreases. During the adjusting period $T_{ADJi}$, the controller 620 maintains the switch 218 off. The operation during the switching cycle $T_{Si}$ of the power converter 600 is similar to that during the switching cycle $T_S$ of the power converter 200 in FIG. 2.

Moreover, the controller 620 varies a frequency $f_{SW}$ of a control signal, e.g., the pulse-width modulation signal PWM2 or the signal OD, periodically by controlling the adjusting period $T_{ADJi}$. In one embodiment, the controller 620 varies the adjusting period $T_{ADJ}$ periodically, thereby varying the switching frequency $f_{SW}$ of the control signal and the switch 218 periodically. More specifically, the transformer 202 can operate in multiple cycle groups. In one embodiment, each cycle group includes the same number of switching cycles of the switch 218.

In the example of FIG. 8A, switching cycles $T_{S1}$-$T_{S6}$ constitute a cycle group. However, the invention is not so limited; the cycle group can include other number of switching cycles. During the switching cycles $T_{S1}$-$T_{S6}$, the controller 620 controls the charging period $T_{ON}$ and the discharging period $T_{DIS}$ to be substantially constant. By way of example, the charging period $T_{ON}$ is determined by the peak level $I_{PEAK}$ of the current $I_{PR}$ and determined by the voltage $V_{BB}$ applied to the primary winding 204. In one embodiment, the peak level $I_{PEAK}$ and the voltage $V_{BB}$ are substantially constant, and therefore the charging periods $T_{ON}$ in the switching cycles $T_{S1}$-$T_{S6}$ can be substantially the same. In addition, the discharging period $T_{DIS}$ is determined by the peak level $I_{SE\_MAX}$ of the current $I_{SE}$ and determined by a voltage $V_{OUT}'$ across the secondary winding 206. In one embodiment, the peak level $I_{SE\_MAX}$ and the voltage $V_{OUT}'$ are substantially constant, and therefore the discharging periods $T_{DIS}$ in the switching cycles $T_{S1}$-$T_{S6}$ can be substantially the same. The adjusting period $T_{ADJ1}$-$T_{ADJ6}$ may vary in different switching cycles.

According to equation (1), the average level $I_{OAVG}'$ of the output current provided by the secondary winding 206 during a cycle group can be calculated by:

$$I'_{OAVG} = \frac{I_{SE\_MAX}}{2} \cdot \left( \frac{6T_{DIS}}{T_{S1} + T_{S2} + T_{S3} + T_{S4} + T_{S5} + T_{S6}} \right) = \frac{I_{SE\_MAX}}{2} \cdot R, \quad (7)$$

where $T_{Si}=T_{ON}+T_{DIS}+T_{ADJi}$ (i=1, 2, 3, 4, 5, or 6). In other words, the average level $I_{OAVG}'$ of the current $I_{SE}$ flowing through the secondary winding 206 during the switching cycles $T_{S1}$-$T_{S6}$ is determined by a ratio R of the summation of the discharging periods in the switching cycles $T_{S1}$-$T_{S6}$ to the summation of the charging periods, the discharging periods and the adjusting periods in the switching cycles $T_{S1}$-$T_{S6}$.

Advantageously, by varying the adjusting period $T_{ADJ}$ in multiple switching cycles, the controller 620 varies the frequency $f_{SW}$ of the signals PWM and OD, thereby decreasing the electromagnetic interference of the power converter 600. Furthermore, in one embodiment, by varying the adjusting period $T_{ADJ}$ periodically, the controller 620 varies the frequency $f_{SW}$ of the signals PWM and OD periodically. Since the ratio R is substantially constant during every cycle group, the average level $I_{OAVG}'$ of the current $I_{SE}$ flowing through the secondary winding 206 is substantially constant. As used herein, "substantially constant" means that the average level $I_{OAVG}'$ may vary but within a range such that the current ripple caused by non-ideality of the circuit components can be neglected. In one embodiment, the controller 620 repeats the variation process of the adjusting period $T_{ADJi}$ periodically.

For example, the controller 620 adjusts the adjusting period $T_{ADJi}$ from the value $T_{ADJ1}$ to the value $T_{ADJ6}$, e.g., in the manner as shown in FIG. 8A, during the cycle group that includes the switching cycles $T_{S1}$-$T_{S6}$, followed by repeating the adjusting process. FIG. 8B shows examples of the signals in the next cycle group immediately following the cycle group in FIG. 8A. The adjusting periods $T_{ADJi}$ in the switching cycles $T_{S1}$-$T_{S6}$ in FIG. 8B are respectively equal to the adjusting periods $T_{ADJi}$ in the switching cycles $T_{S1}$-$T_{S6}$ in FIG. 8A.

The power converter according to the present invention can be used in various applications. In one embodiment, the power converter can provide a substantially constant current to power a light source such as a light emitting diode (LED) string. In another embodiment, the power converter can provide a substantially constant current to charge a battery.

Figure 7:
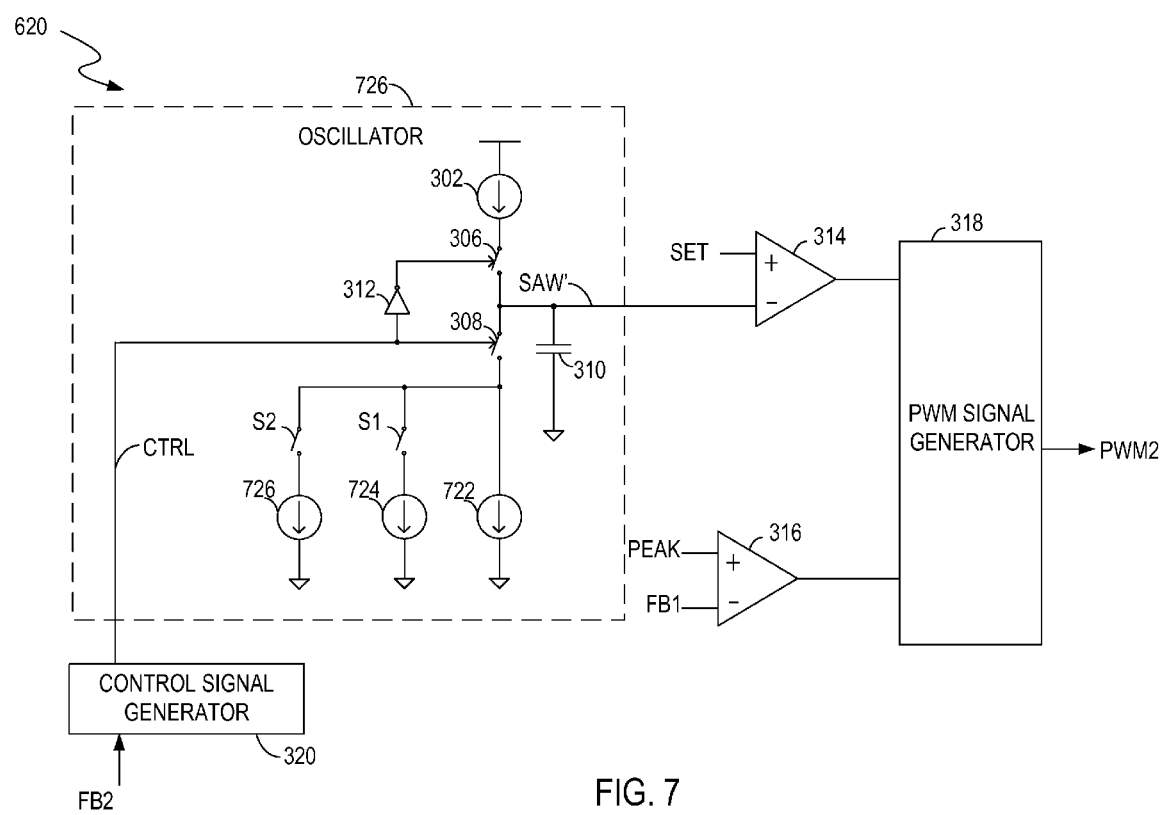
FIG. 7 shows an example of a controller in FIG. 6, in accordance with one embodiment of the present invention.

FIG. 7 shows an example of the controller 620 in FIG. 6, in accordance with one embodiment of the present invention. Elements labeled the same as in FIG. 3 and FIG. 6 have similar functions. FIG. 7 is described in combination with FIG. 3, FIG. 6 and FIG. 8A. The controller 620 can vary the adjusting period $T_{ADSJi}$ periodically, thereby decreasing the EMI of the power converter 600 and providing an output current with a substantially constant average level to the load 212.

In one embodiment, the controller 620 includes a signal generator 726 (e.g., an oscillator), a comparator 314, a comparator 316, and a pulse signal generator 318 (e.g., a PWM signal generator 318). The signal generator 726 is operable for generating a signal, e.g., a sawtooth wave signal SAW' based on the feedback signals FB1 and FB2. The comparator 314 is operable for comparing the sawtooth wave signal SAW' with a reference signal SET. The reference signal SET has a reference voltage level $V_{SET}$. The comparator 316 is operable for comparing the feedback signal FB1 with a reference signal PEAK. The feedback signal FB1 indicates the current $I_{PR}$ flowing through the primary winding 204. The reference signal PEAK can determine the peak level $I_{PEAK}$ of the current $I_{PR}$ flowing through the primary winding 204. The PWM signal generator 318 coupled to the comparator 314 and the comparator 316 is operable for generating a pulse signal, e.g., a PWM signal PWM2, based on the sawtooth signal SAW'. The sawtooth wave signal SAW' from the signal generator 726 can be configured to control a duty cycle of the PWM signal PWM2. The PWM signal PWM2 is applied to the switch 218 to control a conductance status of the switch 218 so as to control power of the transformer 202.

The controller 620 can further include a control signal generator 320 to generate a control signal CTRL based on the feedback signal FB2. The control signal CTRL is applied to the signal generator 726. In one embodiment, if the voltage of the feedback signal FB2 is greater than a predetermined threshold TH (e.g., TH>0V), the control signal CTRL is logic 1; otherwise, the control signal CTRL is logic 0.

In the example of FIG. 7, the signal generator 726 includes current sources 302, 722, 724 and 726, switches 306, 308, S1 and S2, and an energy storage element, e.g., a capacitor 310. The switches S1 and S2 are coupled to the current sources 724 and 726 in series respectively. The capacitor 310 generates an output voltage which is the sawtooth wave signal SAW'. The capacitor 310 can be charged or discharged depending on the conduction status of the switches 306 and 308. The discharging current $I_{DIS}$ of the capacitor 310 is varied according to the conduction status of the switches S1 and S2. For example, when the switch S1 is on and the switch S2 is off, the discharging current $I_{DIS}$ of the capacitor 310 during the discharging period $T_{DIS}$ includes the currents from the current sources 722 and 724. When the switches S1 and S2 are off, the discharging current $I_{DIS}$ of the capacitor 310 during the discharging period $T_{DIS}$ includes the current from the current source 722. In one embodiment, the on periods of the switches S1 and S2 are controlled to vary periodically, and thus the discharging current $I_{DIS}$ is varied periodically.

In operation, if the voltage of the capacitor 310 increases to the reference voltage level $V_{SET}$, the controller 620 generates a PWM signal PWM2 having a first level to turn on the switch 218 (e.g., the PWM signal PWM2 is logic 1). Thus, the transformer 202 operates in the charging period $T_{ON}$. During the charging period $T_{ON}$, the switch 218 is turned on, and the current $I_{PR}$ flowing through the primary winding 204 can increase from a bottom level, e.g., zero amperes, to the peak level $I_{PEAK}$. Furthermore, during the charging period $T_{ON}$, the sawtooth wave signal SAW', e.g., the voltage across the capacitor 310, increases from the reference voltage level $V_{SET}$ to the first level $V_1$.

More specifically, during the charging period $T_{ON}$, the clamp circuit 228 can force the voltage of the feedback signal FB2 to be substantially zero such that the control signal CTRL has a first level, e.g., logic 0, in one embodiment. In the example of FIG. 7, when the control signal CTRL is logic 0, the switch 306 is turned on and the switch 308 is turned off. Thus, during the charging period $T_{oN}$, the capacitor 310 is charged by a current from the current source 302, and the voltage of capacitor 310, e.g., the sawtooth wave signal SAW', can increase from the reference voltage level $V_{SET}$. Meanwhile, the current $I_{PR}$ flowing through the primary winding 204 increases. The comparator 316 compares the feedback signal FB1 with the reference signal PEAK. When the voltage of the feedback signal FB1 reaches the voltage of the reference signal PEAK, which indicates that the current $I_{PR}$ through the primary winding 204 increases to the peak level $I_{PEAK}$, the controller 620 turns off the switch 218 to terminate the charging period $T_{ON}$ and to initiate a discharging period $T_{DIS}$. More specifically, the PWM signal generator 318 can generate the PWM signal PWM2 having a second level (e.g., the PWM signal PWM2 is logic 0) to turn off the switch 218. At the end of the charging period $T_{ON}$, the voltage of the capacitor 310, e.g., the sawtooth wave signal SAW', can increase to a first level $V_1$ as shown in FIG. 8A.

During the discharging period $T_{DIS}$, the switch 218 is turned off and the current $I_{SE}$ flowing through the secondary winding 206 decreases from a peak level $I_{SE-MAX}$ to the bottom level, and the sawtooth wave signal SAW', e.g., the voltage across the capacitor 310, decreases from the first level $V_1$ to a second level $V_{2i}$.

More specifically, the auxiliary winding 208 generates a substantially constant output voltage during the discharging period $T_{DIS}$, in one embodiment. A voltage divider including the resistors 214 and 216 provides the feedback signal FB2 (e.g., the voltage across the resistor 216) proportional to the output voltage of the auxiliary winding 208, and thus the feedback signal FB2 can also be substantially constant. In one embodiment, the resistance of the resistor 214 and the resistance of the resistor 216 are chosen in a way such that the voltage of the feedback signal FB2 is greater than the predetermined threshold TH during the discharging period $T_{DIS}$. In the example of FIG. 7, because the feedback signal FB2 has a voltage greater than the threshold TH, the control signal CTRL is logic 1. As a result, the switch 306 is turned off and the switch 308 is turned on. The capacitor 310 is discharged by a discharging current $I_{DIS}$ determined by the conduction status of the switches S1 and S2. Accordingly, the voltage of capacitor 310 decreases from the first level $V_1$.

When the voltage of the feedback signal FB2, which indicates the output voltage of the secondary winding 206, decreases to the threshold TH, e.g., the current $I_{SE}$ flowing through the secondary winding 206 decreases to a bottom level (e.g., zero amperes), the controller 620 can terminate the discharging period $T_{DIS}$ and initiate an adjusting period $T_{ADJi}$. At the end of the discharging period $T_{DIS}$, the sawtooth wave signal SAW', e.g., the voltage of the capacitor 310, decreases to a second level $V_{2i}$, as shown in FIG. 8A (i=1, 2, ... ).

During the adjusting period $T_{ADJi}$, because the voltage of the feedback signal FB2 decreases to the threshold TH, the control signal CTRL turns to logic 0. The switch 306 is turned on and the switch 308 is turned off. The capacitor 310 is charged by the current from the current source 302. The voltage of capacitor 310 increases from the second level $V_{2i}$. During the adjusting period $T_{ADJi}$, the switch 218 remains off and no current flows through the primary winding 204 and the secondary winding 206, in one embodiment. When the sawtooth wave signal SAW' increases to the reference voltage level $V_{SET}$, the controller 620 terminates the adjusting period $T_{ADJi}$ and turns on the switch 218 to initiate a charging period $T_{ON}$ of a next switching cycle. More specifically, the PWM signal generator 318 can generate the PWM signal PWM2 having the first level (e.g., PWM signal PWM1 is logic 1) to turn on the switch 218. Thus, during the adjusting period $T_{ADJi}$, the sawtooth wave signal SAW', e.g., the voltage across the capacitor 310, increases from the second level $V_2$, to the reference voltage level $V_{SET}$.

In the example of FIG. 8A, the controller 620 controls the on periods of the switches S1 and S2 during multiple switching cycles, thereby varying the discharging current $I_{DIS}$ during the switching cycles. Thus, the second level $V_{2i}$ of the sawtooth wave signal SAW', which is equal to $V_1-I_{DIS}T_{DIS}/C_{310}$, varies during the switching cycles accordingly. The parameter $C_{310}$ represents the capacitance of the capacitor 310. Therefore, the adjusting period $T_{ADJi}$ which is equal to $(V_{2i}-V_{SET})/I_{CHG}C_{310}$ varies in the switching cycles ($I_{CHG}$ is the charging current of the capacitor 310) to vary the frequency $f_{SW}$ of the control signal, e.g., PWM2 or OD. In other words, the discharging current $I_{DIS}$ varies in multiple switching cycles to vary the frequency $f_{SW}$ of the control signal PWM2 or OD.

In one embodiment, the current of the current source 302 is $I_1$, the current of the current source 722 is $I_2$, the current of the current source 724 is $I_0$, and the current of the current source of 726 is $2I_0$. In the example of the FIG. 8A, the switches S1 and S2 are selectively turned on in a way such that the discharging current $I_{DIS}$ is equal to $I_2, I_2+I_0, I_2+2I_0, I_2+2I_0, I_2+I_0$, and $I_2$ in the switching cycles $T_{S1}-T_{S6}$ respectively. Although three discharging current sources selectively providing the discharging currents are disclosed in FIG. 7, the invention is not so limited. The controller 620 can include other number of discharging current sources. In one embodiment, the controller 620 includes N+1 discharging current sources to provide currents $I_2, I_0, 2I_0, \ldots, 2^{(N-1)}I_0$ respectively. The controller 620 further includes N switches that are coupled to the corresponding current sources in a similar way as described in relation to FIG. 7.

Figure 9:
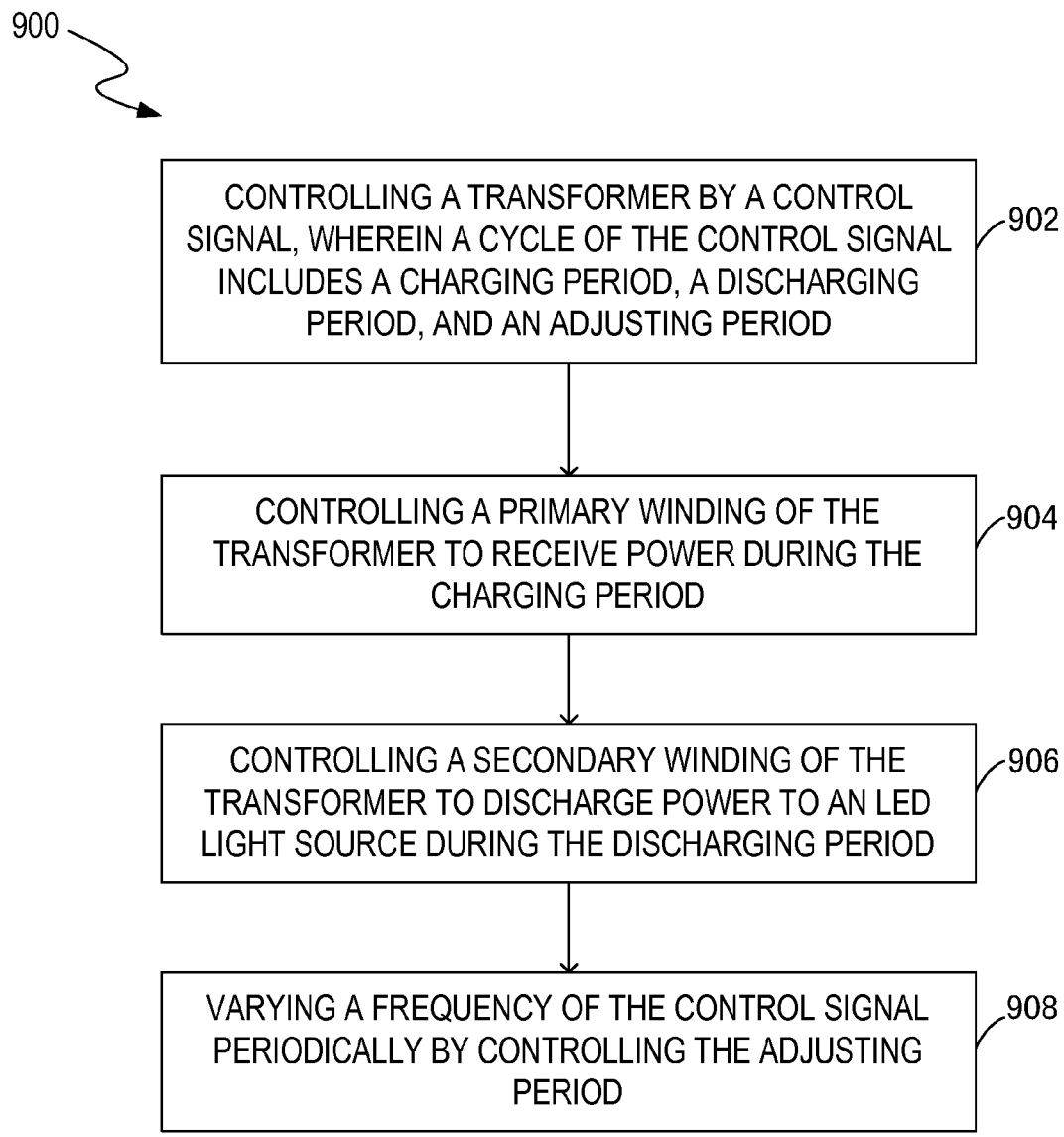
FIG. 9 shows a flowchart of an example of a method for controlling power of an LED light source, in accordance with one embodiment of the present invention.

FIG. 9 shows a flowchart 900 of an example of a method for controlling power of an LED light source, in accordance with one embodiment of the present invention. FIG. 9 is described in combination with FIG. 6, FIG. 7, FIG. 8A and FIG. 8B.

In block 902, a control signal, e.g., the signal PWM2 or the signal OD, from the controller 620 controls the transformer 202 to operate in multiple switching cycles of the control signal. In one embodiment, a switching cycle includes a charging period $T_{ON}$, a discharging period $T_{DIS}$, and an adjusting period $T_{ADJi}$. In block 904, the primary winding 204 of the transformer 202 is controlled to receive power during the charging period $T_{ON}$. More specifically, in one embodiment, during the charging period $T_{ON}$, the switch 218 coupled in series with the primary winding 204 is turned on, and the transformer 202 is powered by input power during the charging period $T_{ON}$. In one embodiment, the charging period $T_{ON}$ is controlled by monitoring a current flowing through the primary winding 204. For example, the charging period $T_{ON}$ can be terminated and a discharging period $T_{DIS}$ can be initiated when the current flowing through the primary winding 204 increases to a peak level $I_{PEAK}$.

In block 906, the secondary winding 206 of the transformer 202 is controlled to discharge power to the LED light sources 212 during the discharging period $T_{DIS}$. In one embodiment, the switch 218 is turned off during the discharging period $T_{DIS}$. The discharging period $T_{DIS}$ can be controlled by monitoring an output voltage of an auxiliary winding 208 of the transformer 202. The output voltage of an auxiliary winding 208 can indicate whether a current flowing through the secondary winding 206 decreases to a bottom level. For example, the discharging period $T_{DIS}$ can be terminated and an adjusting period $T_{ADJi}$ can be initiated when the current flowing through the secondary winding 206 decreases to the bottom level, e.g., zero. In one embodiment, the current flowing through the secondary winding 206 decreases to the bottom level if the output voltage of the auxiliary winding 208 decreases to a predetermined voltage.

In block 908, the controller 620 varies the switching frequency $f_{SW}$ of the control signal periodically by controlling the adjusting period $T_{ADJi}$. During the adjusting period $T_{ADJi}$, the switch 218 is turned off. In one embodiment, the adjusting period $T_{ADJi}$ is varied periodically to vary the frequency $f_{SW}$ of the control signal periodically. In one embodiment, the duration of the adjusting period $T_{AWJi}$ can be determined by the signal generator 726. The signal generator 726 is operable for generating a sawtooth wave signal SAW' by charging or discharging the capacitor 310. During the charging period $T_{ON}$, the capacitor 310 is charged by a first current to increase the voltage across the capacitor 310, e.g., the sawtooth wave signal SAW', from a reference level $V_{SET}$ to a first level $V_1$. During the discharging period $T_{DIS}$, the capacitor 310 is discharged by a second current to decrease the signal SAW' from the first level $V_1$ to a second level $V_{2i}$. The second current is varied in multiple switching cycles of the control signal to vary the frequency $f_{SW}$ of the control signal. During the adjusting period $T_{ADJi}$, the capacitor 310 is charged by the first current to increase the signal SAW' from the second level $V_{2i}$ to the reference level $V_{SET}$. When the voltage of the sawtooth wave signal SAW' increases to the reference level $V_{SET}$, the adjusting period $T_{ADJi}$ is terminated and a new switching cycle $T_S$ begins.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for controlling power to a light-emitting diode (LED) light source, said controller comprising:
a control terminal for providing a control signal to control a transformer, wherein a cycle of said control signal comprises a charging period, a discharging period, and an adjusting period; and
control circuitry coupled to said control terminal and for controlling a primary winding of said transformer to receive power during said charging period, for controlling a secondary winding of said transformer to discharge power to said LED light source during said discharging period, and for varying a frequency of said control signal periodically by controlling said adjusting period, and for adjusting said frequency from a first frequency-value to a second frequency-value during a plurality of cycles of said control signal followed by repeating said adjusting.

2. The controller of claim 1, wherein said control signal controls said transformer such that a current flowing through said primary winding increases from a first bottom level to a first peak level during said charging period and a current flowing through said secondary winding decreases from a second peak level to a second bottom level during said discharging period, and wherein said adjusting period varies in said cycles to vary said frequency.

3. The controller of claim 1, wherein said control circuitry adjusts said adjusting period from a first value to a second value during said cycles followed by repeating the adjusting of said adjusting period, such that said frequency varies periodically.

4. The controller of claim 1, wherein a switch coupled in series with said primary winding is on during said charging period and is off during said discharging and adjusting periods.

5. The controller of claim 1, further comprising:
a first feedback terminal for receiving a first feedback signal indicating whether a current flowing through said primary winding increases to a peak level; and
a second feedback terminal for receiving a second feedback signal indicating whether a current flowing through said secondary winding decreases to a bottom level.

6. The controller of claim 1, further comprising:
a signal generator for generating a sawtooth wave signal that increases from a reference level to a first level during said charging period, decreases from said first level to a second level during said discharging period, and increases from said second level to said reference level during said adjusting period.

7. The controller of claim 6, wherein said sawtooth wave signal is generated based on a first feedback signal indicating whether a current flowing through said primary winding increases to a peak level, and based on a second feedback signal indicating whether a current flowing through said secondary winding decreases to a bottom level.

8. The controller of claim 6, wherein a switch coupled in series with said primary winding is controlled by a pulse signal generated based on said sawtooth wave signal, and wherein said switch is on during said charging period and is off during said discharging and adjusting periods.

9. The controller of claim 1, further comprising:
an energy storage element charged by a first current to increase a voltage across said energy storage element from a reference level to a first level during said charging period, discharged by a second current to decrease said voltage from said first level to a second level during said discharging period, and charged by said first current to increase said voltage from said second level to said reference level during said adjusting period,
wherein said second current varies in said cycles to vary said frequency.

10. The controller of claim 1, wherein an average level of a current flowing through said secondary winding during said cycles is determined by a ratio of the summation of a plurality of discharging periods in said cycles to the summation of a plurality of charging periods, said plurality of discharging periods and a plurality of adjusting periods in said cycles.

11. The controller of claim 1, wherein an average level of a current flowing through said secondary winding is substantially constant.

12. A system for controlling power to a light-emitting diode (LED) light source, said system comprising:
a transformer for providing power to said LED light source and comprising a primary winding and a secondary winding; and
a controller for controlling a switch coupled in series with said primary winding to control said transformer to operate in a plurality of switching cycles, wherein a switching cycle of said switching cycles comprises a charging period, a discharging period, and an adjusting period,
wherein said controller increases a current flowing through said primary winding during said charging period, and decreases a current flowing through said secondary winding during said discharging period, wherein said controller controls said adjusting period to vary a switching frequency of said switch periodically, and wherein said controller adjusts said switching frequency from a first frequency-value to a second frequency-value during said switching cycles followed by repeating the adjusting of said switching frequency.

13. The system of claim 12, wherein a ratio of the summation of a plurality of discharging periods in said switching cycles to the summation of a plurality of charging periods, said plurality of discharging periods and a plurality of adjusting periods in said switching cycles is substantially constant.

14. The system of claim 12, wherein said switch is controlled by a pulse signal generated based on a feedback signal indicating whether said current flowing through said secondary winding decreases to a bottom level.

15. The system of claim 14, wherein said controller comprises:
a signal generator for generating a sawtooth wave signal based on said feedback signal,
wherein said sawtooth wave signal increases from a reference level to a first level during said charging period, decreases from said first level to a second level during said discharging period, and increases from said second level to said reference level during said adjusting period.

16. The system of claim 12, wherein said controller comprises:
an energy storage element charged by a first current during said charging and adjusting periods, and discharged by a second current during said discharging period,
wherein said second current varies in said switching cycles to vary said switching frequency.

17. A method for controlling power to a light-emitting diode (LED) light source, said method comprising:
controlling a transformer by a control signal, wherein a cycle of said control signal comprises a charging period, a discharging period, and an adjusting period;
controlling a primary winding of said transformer to receive power during said charging period;

controlling a secondary winding of said transformer to discharge power to said LED light source during said discharging period; and varying a frequency of said control signal periodically by controlling said adjusting period, wherein said varying comprises adjusting said frequency from a first frequency-value to a second frequency-value during a plurality of cycles of said control signal followed by repeating said adjusting.

18. The method of claim 17, further comprising:

controlling a ratio of the summation of a plurality of discharging periods in said cycles to the summation of a plurality of charging periods, said plurality of discharging periods and a plurality of adjusting periods in said cycles to be substantially constant.

19. The method of claim 17, further comprising:

turning on a switch coupled in series with said primary winding during said charging period; and turning off said switch during said discharging and adjusting periods.

20. The method of claim 17, further comprising:

charging an energy storage element by a first current to increase a voltage across said energy storage element from a reference level to a first level during said charging period;

discharging said energy storage element by a second current to decrease said voltage from said first level to a second level during said discharging period;

charging said energy storage element by said first current to increase said voltage from said second level to said reference level during said adjusting period; and varying said frequency by varying said second current in said cycles.

* * * * *